May 9, 1933.  T. C. SHEEHAN  1,907,595
FINISH HONING MACHINE FOR RAZOR BLADES
Filed July 26, 1928  7 Sheets-Sheet 2

May 9, 1933.  T. C. SHEEHAN  1,907,595
FINISH HONING MACHINE FOR RAZOR BLADES
Filed July 26, 1928  7 Sheets-Sheet 4

May 9, 1933. T. C. SHEEHAN 1,907,595
FINISH HONING MACHINE FOR RAZOR BLADES
Filed July 26, 1928 7 Sheets-Sheet 5

INVENTOR
Thomas C. Sheehan
BY
Sydney J. Prescott
ATTORNEY

May 9, 1933.  T. C. SHEEHAN  1,907,595
FINISH HONING MACHINE FOR RAZOR BLADES
Filed July 26, 1928.   7 Sheets-Sheet 6

May 9, 1933.  T. C. SHEEHAN  1,907,595
FINISH HONING MACHINE FOR RAZOR BLADES
Filed July 26, 1928  7 Sheets-Sheet 7

Thomas C. Sheehan INVENTOR
BY Sydney J. Prescott ATTORNEY

Patented May 9, 1933

1,907,595

UNITED STATES PATENT OFFICE

THOMAS CORNELIUS SHEEHAN, OF UPPER MONTCLAIR, NEW JERSEY, ASSIGNOR TO WADE & BUTCHER CORPORATION, A CORPORATION OF NEW JERSEY

FINISH HONING MACHINE FOR RAZOR BLADES

Application filed July 26, 1928. Serial No. 295,595.

This invention relates to honing machines for razor blades, particularly those of the thin replaceable type used in certain safety razors, in which the blades are automatically and uniformly honed by forwarding the blades past a suitable honing surface. One important object of the invention is to produce a machine of this type which will satisfactorily finish hone the new curved razor blades which are concave on one side and convex on the other.

Heretofore, great difficulty has been had in guiding and holding steady the blades while being honed, particularly on the concave side on which the honing surface must be very close to the body of the blade. Added difficulty is presented when, as in the present machine, it is desired to hollow hone the edge, necessitating that the center of rotation of the hones be close to the blade. It is, therefore, an object of the invention to provide suitable guiding means which will firmly support the blades against vibration or tilting in a machine of this type.

Another object of the invention is to provide a finished hone which will result in improved honing of the delicate edge of the razor blades. This improved honing is attained to a large extent by providing hones rotating about a center parallel to the path of the blades and of great length as compared to the length of the blades, whereby the blades travel a very considerable distance in contact with the rotating hone. As a result, a large component of the grinding action of the hones is longitudinal of the blade edge, which has the effect of aligning the delicate edge portions at the same time that they are ground. In this way, an edge substantially free from rough irregular saw-teeth, commonly observed when blades are viewed under a magnifying glass, is produced.

Another object of the invention is to protect the blade edges and the honing surfaces from injury by burrs left on the blade in grinding, and from grit, by a suitable grit and burr removing operation prior to honing. Still another object is to prevent undue wear of the hones by providing hones of relatively great length and of sufficient number, against which the blades need press but lightly to obtain the necessary amount of honing. Still another object attained by the long cylindrical hones used is that the hones thus act as a guide along the side of one edge of the blade so that providing a suitable guide means, fixing the path of the other edge of the blade, will maintain the blade at the desired angle and in proper alignment with respect to the hones.

With these and other objects not specifically mentioned in view, the invention consists in certain constructions and combinations which will be hereinafter fully described and then set forth in the appended claims.

In the accompanying drawings which form a part of this specification and in which like characters of reference indicate the same or like parts:

Figs. 3 and 4 constitute the right and left halves, respectively, of a complete elevation view of the machine shown in Figs. 1 and 2;

Fig. 7 is a section taken on line 7—7 of Fig. 1 in the direction of the arrows;

In carrying the invention into effect, there is provided means for forwarding razor blades in a right line with an edge exposed, together with a pair of rotating shafts parallel with and on opposite sides of the path of said blade, and a series of cylindrical hones mounted in spaced relation along each of said shafts for rotation in the path of said blades. In the best constructions, the cylindrical surfaces of the hone on one shaft enter into the spaces between the hones on the other shaft, so that the said surfaces may intersect at the edge of the blade. In the best constructions also, a series of spring fingers are provided opposite and cooperating with the hones to hold the exposed edge of the blades against the hones. The best form of the invention contemplated will also include means for removing burrs and grit from the exposed edge of the blades prior to honing. The means above referred to may be widely varied within the scope of the claims, for the particular machine selected to illustrate the invention is but one of many possible embodiments of the same. The invention, therefore, is not to be restricted to the precise details of the structure shown and described.

Figure 4:
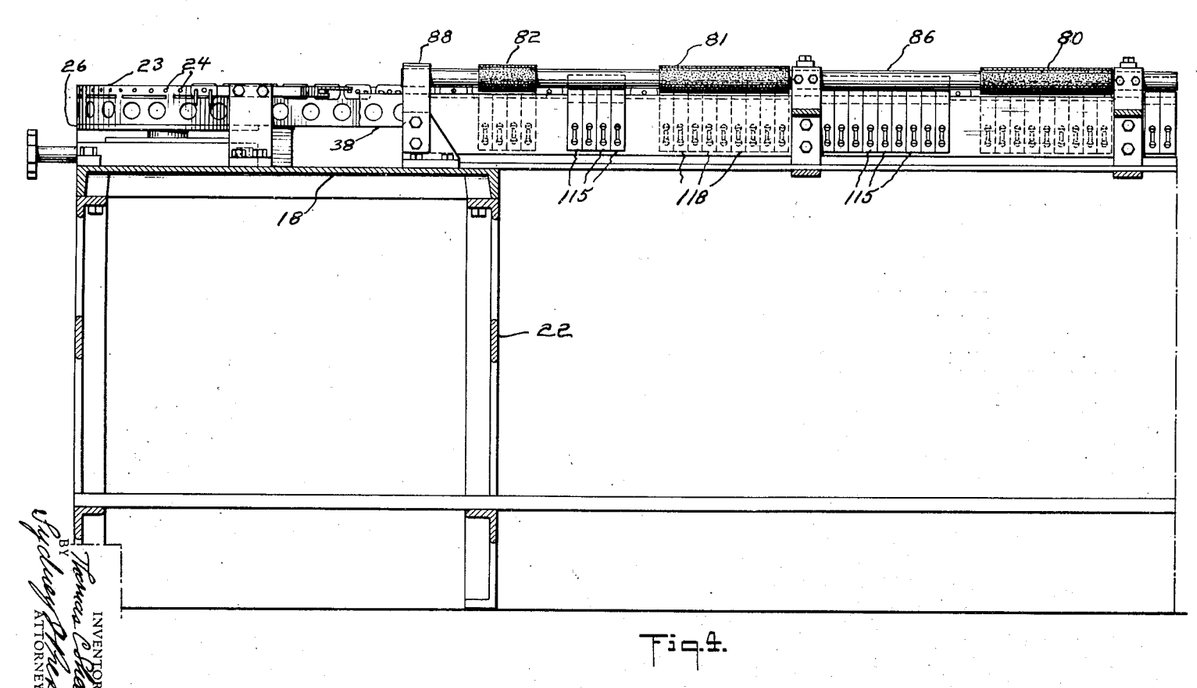
Figure 5:
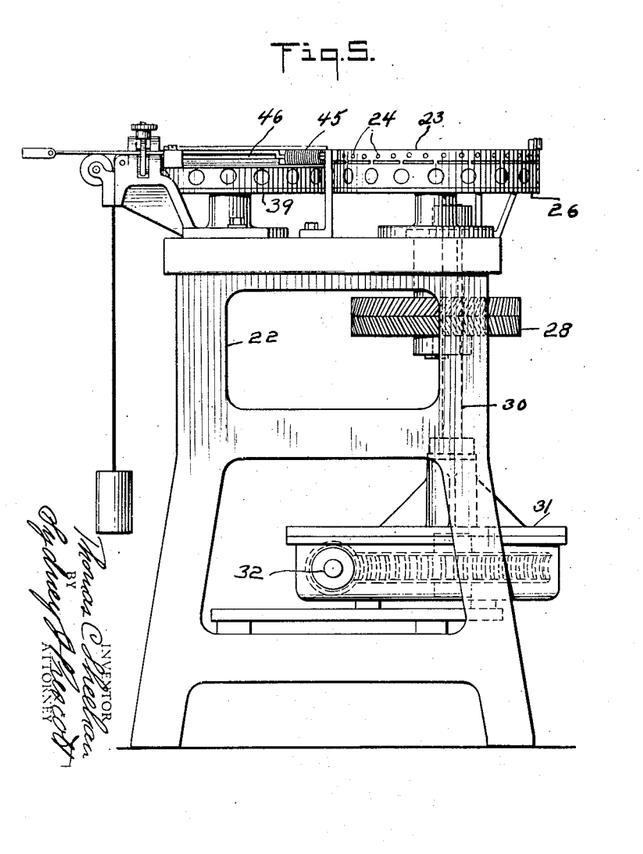
Figs. 5 and 6 are elevations respectively of the forward and rear ends of the machine shown in Figs. 1 and 2.
Figure 6:
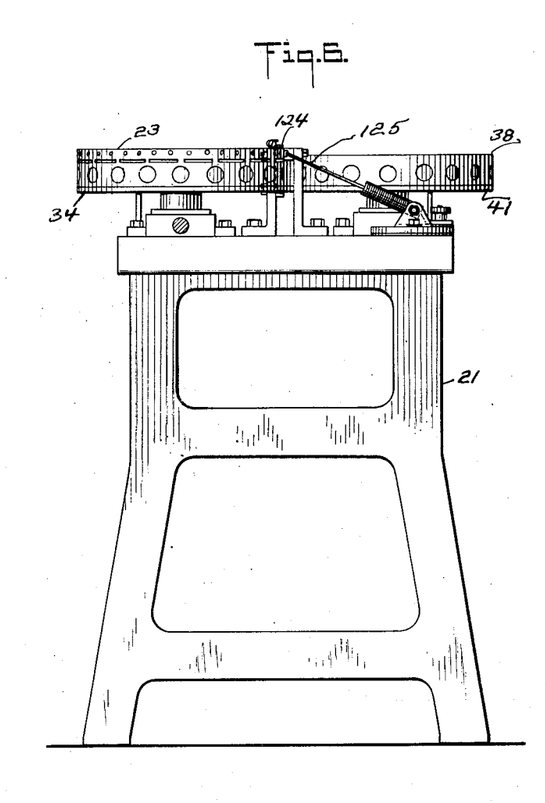

Referring to Figs. 1 to 4 of the drawings, tables 17 and 18 are provided, connected by a pair of girders 19 and 20, and supported by frames 21 and 22, respectively. The blade forwarding belt 23, which travels from left to right (as seen in Fig. 3), carries the blades 25 on lugs 24, which pass through the perforations in the blades. This forwarding belt 23 is mounted on a horizontal pulley 26 and secured to the upper end of a short vertical shaft 27, at the lower end of which is provided a gear 28, as shown in Fig. 5, driven by a gear 29 on a vertical shaft 30 driven through a transmission 31 by drive shaft 32 from a motor 33, the motor and the transmission being suitably supported under the table on frames 21 and 22. The second horizontal pulley 34 supports the belt at the other end and is journalled on a shaft 35 on a slide 36, which is adjustable in a slideway 37 to tension the belt.

Also mounted on the tables 17 and 18 is a stationary belt 38 mounted on a fixed pulley 39 on a shaft 40 secured to the table 17, and on a pulley 41 mounted on a shaft 42 secured to a slideblock 43 and a slide 44, whereby the pulley 41 is adjustable to tension the belt 38.

To automatically feed blades for forwarding between the belts 23 and 38, a stack of blades 45 is supported on arbors 46 from which the blades are carried by the lugs 24 between the guides 47 and 48, bracketed to the table 17.

The particular construction of this blade feeding means forms no part of the present invention, reference being made to a copending application filed July 26, 1928, S. N. 295,597 for a full disclosure of the same.

Further forwarding movement of the blades carries the blades between the guide plates 50 and 51, which guide the portion of the belts 23 and 38 below the lugs 24. For this purpose, the belts 23 and 38 are made much broader than the blades, the belt 23 being recessed at a distance below the edge of the belt, so that the lower edge of the blade will be received into the recess, thus enabling the portion of the belt above the recess to fit snugly into the concave side of the blade. The inside faces of the guide plates 50 and 51 are cut away to a small depth to receive the belts 23 and 38, leaving shoulders supporting the lower edges of these belts. The face of the plate 51 is suitably grooved to clear the edge of the blade projecting through the recess in the belt 23. The upper edge of the stationary belt 38 supported by the guide plate 50 carries the lugs 24 of the belt. Thus it will be seen that the belts 23 and 38 are firmly guided and supported against both vertical and horizontal vibration along the entire length of the belts opposite the cleaning and honing elements.

Figures 1, 11:
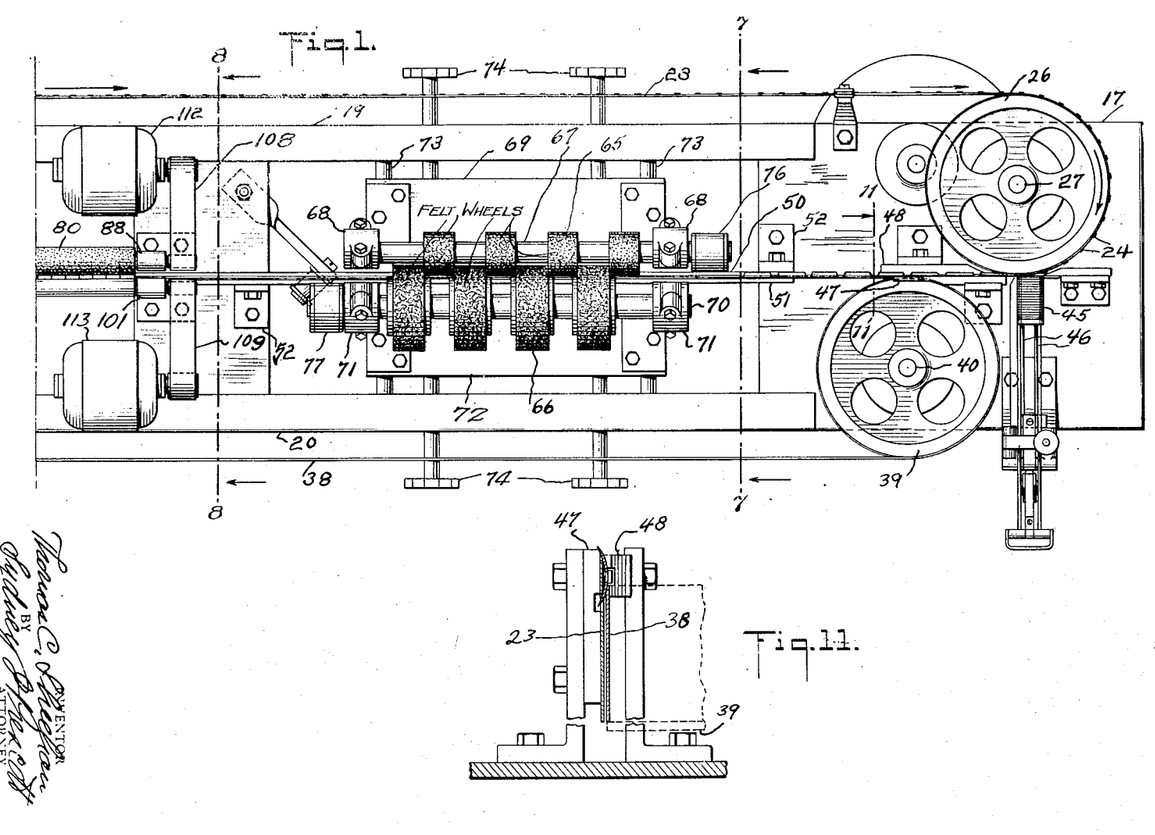
Figs. 1 and 2 comprise the right and left hand halves, respectively, of a complete plan view of a machine in accordance with the invention.
Fig. 11 is a detail sectional view on the line 11—11 of Fig. 1.
Figure 2:
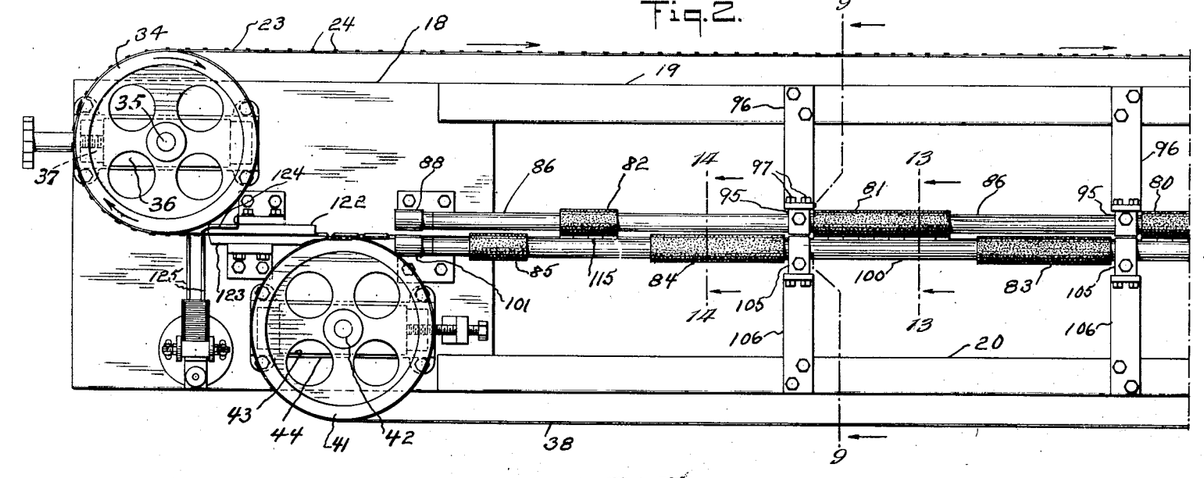

As the blades are forwarded to the hones, they first pass a series of felt wheels 65 and 66 on opposite sides respectively of the blades, for the purpose of rubbing off any burrs or grit liable to injure the hones, or the honed surface of the blade. The series of wheels 65 are spaced along a shaft 67 and, as will be seen from Fig. 1, are relatively small compared with the wheels 66, in order to fit the surface on the concave side of the blade. This shaft 67 is mounted in bearings 68 bracketed to a platform 69. The wheels 66 are mounted on a shaft 70 journalled in bearings 71 bracketed on a platform 72. The platforms 69 and 72 are slidable on horizontal guides 73, along which they are adjusted by hand wheels 74 journalled against longitudinal movement in the girders 19 and 20, and in threaded engagement with blocks 75 on the platforms 69 and 72. Pulleys 76 and 77 on the shafts 67 and 70 drive the cleaning wheels from the drive shaft 32.

Figure 12:
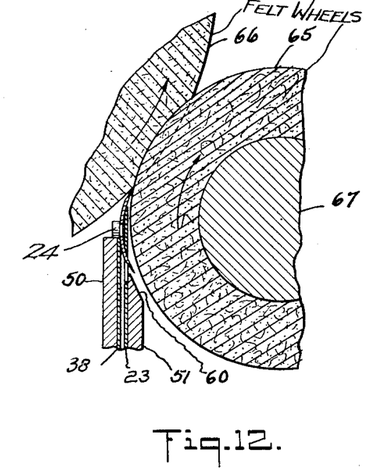
Fig. 12 is a detail view in section showing the position of the blade on the forwarding means as it passes between the wheels.
Figure 13:
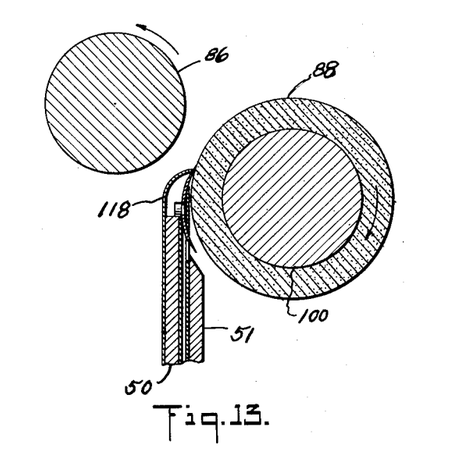
Fig. 13 is a detail view in section showing the means guiding the blade as it passes the hones on the concave side.

The cleaning wheels 65 and 66, on opposite sides of the blades, are in staggered relation, the wheels on one side entering a little into the space between the wheels on the other side, the purpose of this being to cause the cleaning surfaces of the wheels to intersect, as shown in Fig. 12, at the edge of the blade. It is noted that the smaller wheels 65 on the concave side of the blades are below the wheels 66, the object being, as shown in Fig. 12, to engage the concave and convex edge surfaces of the blades at the same angle. In order to admit the wheels 65 to the blade, the guide plate 51 is cut away opposite each wheel, as shown at 60 (Fig. 12).

After cleaning, the blades are forwarded past two series of cylindrical hones of relatively small diameter as compared with their length, on opposite sides of the path of the blades. The hones 80, 81, 82 on the concave side of the blades are mounted on a single shaft 86 which extends parallel to the path of the blades from a point near the cleaning device, all the way to the takeoff device. This shaft 86 is positioned sufficiently close to the path of the blades so that the hones are in engagement with the exposed edge of the blades, and is supported in end bearings 88 mounted in slideways 89 on brackets 90, to which they are secured by cap screws 91 passing through slots in the bearing 88. The shaft is supported centrally by bearings 94, having bearing caps 95 fastened thereto, and supported by brackets 96 to which the bearings 94 are secured by cap screw 97 through a slot in the bracket. The other end of the bracket 96 is fixed to the girder 19. The shaft 100 similarly mounting the hones 83, 84, 85 is rotatably supported by end bearings 101 slidable in slideways 102 on brackets 103 secured to the tables 17 and 18.

This shaft 100 is supported centrally by bearings 104 provided with bearing caps 105 and supported on brackets 106 to which the bearing is secured by the cap screw 107 through a slot in the bracket, the bracket being fixedly secured to the girder 20.

Figure 8:
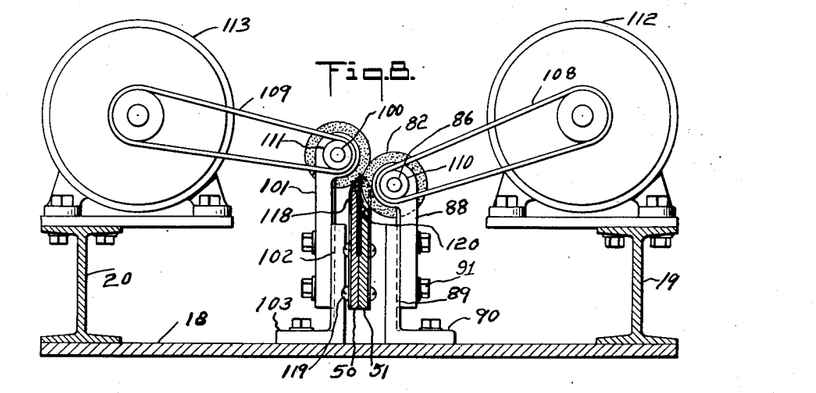
Fig. 8 is a section on the line 8—8 of Fig. 1, looking in the direction of the arrows.

The hones on the shafts 86 and 100 are staggered so that the hones on one shaft may enter into the spaces between the hones on the other side. Also the hones on the concave side of the blade are below the hones on the convex side, permitting the surfaces of each set of hones to approach the surface of the blade at substantially the same angle. As shown in Fig. 8, the guide plate 51 is cut away at 120 in the wake of hones 81, 82, 83, to admit them to the blade. To drive the hones. shafts 86 and 100 are provided with suitable pulleys 110 and 111 connected by belts 108 and 109, respectively, to independent motors 112 and 113 mounted on the girders 19 and 20.

Figure 14:
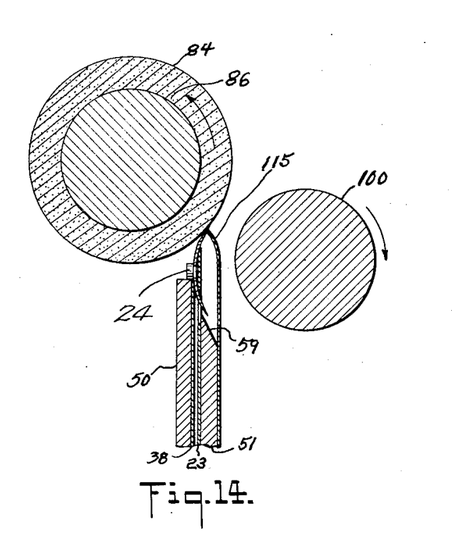
Fig. 14 is a detail view in section showing the means guiding the blade as it passes the hones on the convex side.
Figure 15:
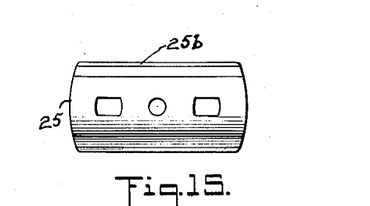
Figs. 15 and 16 show the convex and concave sides, respectively, of the blades.
Figure 16:
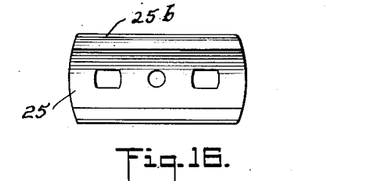

As the blades pass along the cylindrical faces of the hones, they are guided by the stationary belt 38 and plates 50 and 51 exactly as these blades were guided past the cleaning wheels. The upper edge of the blade is held against the surface of the hones by a series of spring fingers 115 fastened in side by side relation on the plate 51 (Fig. 4). These fingers 115 engage the entire length of the concave edge surface of the blade (Fig. 14), pressing the edge lightly against the hones on the convex side of the blade. As the blades pass the hones on the concave side of the blades, they are similarly held against the surface of the hones by spring fingers 118 fastened to the guide plate 50 in side by side relation, with their upper curved edges engaging the convex edge surface of the blades along their entire length. Both the spring fingers 115 and 118 are secured for vertical adjustment by a pair of screws 116 and 119, respectively. It will be seen from an inspection of Figs. 8 and 9 that the blades, during forwarding past the hones, are firmly held in a fixed path by the stationary belt 38 engaging the lower side of the lugs and also engaging the blade below the lugs, and the blade is further steadied by the guiding of the broad lower portion of the forwarding belt by the guide plate 51. The upper edge of the blade is guided in a definite path both by the straight cylindrical surface of the hones and by the line of spring fingers which are placed close together to engage the upper edge of the blades along their entire length.

Figure 9:
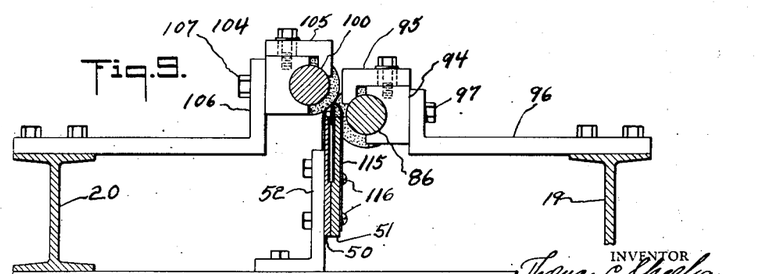
Fig. 9 is a section taken on line 9—9 of Fig. 2, looking in the direction of the arrows.
Figure 10:
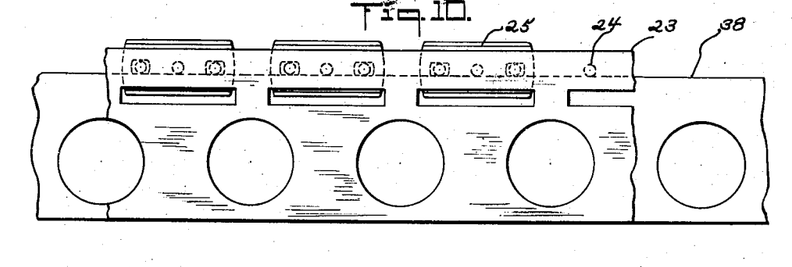
Fig. 10 is a detail side view of a portion of the stationary and forwarding belts, with the blades located between them.

After being forwarded past the hones and the end of the run of the stationary belt 38, the blades are guided between the takeoff guides 122 and 123 bracketed to the table 18, to the ejector finger 124 which flips the blades onto the stacking arbors 125, thereby automatically stacking the blades. The particular construction of the ejecting and stacking device is fully disclosed in the above mentioned copending application and forms no part of the present invention. Accordingly, further description thereof is omitted for the sake of brevity. It is noted that the blades move a considerable distance longitudinally while in contact with each hone. The combination of relatively large longitudinal movement with the rotary honing movement of the straight cylindrical hones tends to align the portions of the delicate edge surface of the blades and at the same time has been found to eliminate to a large extent saw-teeth resulting in a smoother cutting blade than has been obtainable heretofore. The relatively small diameter of the hones and their location, as shown in Figs. 8 and 9, with their honing surfaces meeting the blade along the narrow surface portion close to the edge, results in the narrow hollow honed portion 25b. The effect of this is to produce an edge of the desired thinness, which at the same time has a closely adjacent thicker stiffening portion which will enable the blade to hold its edge.

The lugs 24 on the travelling forwarding belt 23 carry the blades off the stack 45 past the felt cleaning wheels 65 and 66 into engagement with the hones 80, 81, 82 which engage the concave side of the upper edge of the blades, and the hones 83, 84, 85 which engage the convex side thereof. The lower edge of the blades is received by slots in the forwarding belt, and the blades are guided and supported on the forwarding belt by a stationary belt 38 which presses against the convex side of the blades. During said forwarding movement the belts 23 and 38 are guided by plates 50 and 51 which guide the portion of said belts below the lugs 24. In passing the felt wheels, any burrs or grit on the blades liable to injure the hones or the honed surface of the blade are removed. After cleaning and honing the blades are guided between takeoff guides 122 and 123 to the ejector finger 124 which flips the blades onto the stacking arbors 125, thereby automatically stacking the honed blades.

What is claimed is:

1. In a machine for sharpening curved razor blades, the combination with means for forwarding razor blades in a straight path with an edge exposed, of a pair of rotating shafts parallel with and on opposite sides of the path of the blades and out of vertical and horizontal alignment with each other, a series of cylindrical abrading elements mounted in spaced relation on each of said shafts for rotation in the path of said blades, and a series of spring fingers opposite and cooperating with the abrading elements to hold the exposed edge of the blade against the abrading elements, the abrading elements on one shaft entering into the spaces between the abrading elements on the other shaft, and the abrading elements on one shaft being disposed to engage the concave side of the blades along the exposed edge and arranged below the abrading elements on the other shaft, the abrading elements on the latter shaft being disposed to engage the convex side of the blades along said exposed edge.

2. In a machine for honing razor blades, the combination with means for forwarding razor blades in a straight path with an edge exposed, of a pair of rotating shafts parallel with and on opposite sides of the path of the blades, a series of cylindrical hones mounted in spaced relation on each of said shafts for rotation in the path of said blades, and means for removing burrs and grit from said edge prior to honing comprising spaced felt wheels on either side of the path of the blades, the felt wheels on one side of said path entering into the spaces between the felt wheels on the other side of said path.

3. In a machine for sharpening perforated curved razor blades, the combination with a traveling belt engaging the concave side of the blades and having lugs adapted to enter the perforations of the blades for supporting and forwarding the same in a straight path with an edge exposed, said belt having a series of slots for receiving the other edge of the blades, of a rotating abrading element of elongated cylindrical shape with its cylindrical surface lying in the path of said edge to engage the convex side of the blades along said edge and a series of spring fingers opposite the abrading element to guide the blade and hold said edge against the abrading element.

4. In a machine for sharpening perforated curved razor blades, the combination with a traveling belt engaging the concave side of the blades and having lugs adapted to enter the perforations of the blades for supporting and forwarding the same in a straight path with an edge exposed, said belt having a series of slots for receiving the other edge of the blades, of a rotating abrading element of elongated cylindrical shape with its cylindrical surface lying in the path of said edge to engage the convex side of the blades along said edge and a series of spring fingers opposite the abrading element to guide the blade and hold said edge against the abrading element, said fingers being arranged in close side by side relation to engage the blade along substantially its entire length.

5. In a machine for sharpening perforated curved razor blades, the combination with a traveling belt engaging the concave side of the blades and having lugs adapted to enter the perforations of the blades for supporting and forwarding the same in a straight path with an edge exposed, said belt having a series of slots for receiving the other edge of the blades, of a rotating abrading element of elongated cylindrical shape with its cylindrical surface lying in the path of said edge to engage the convex side of the blades along said edge, a series of spring fingers opposite the abrading element to guide the blade and hold said edge against the abrading element, and means guiding the central portion of the blade along a fixed path.

6. In a machine for sharpening razor blades, the combination with means for forwarding razor blades in a straight path with an edge exposed, of a rotating abrading element of elongated cylindrical shape with its cylindrical surface lying in the path of said edge, and a series of spring fingers opposite the abrading element to guide the blade and hold said edge against the abrading element, said forwarding means including a moving belt and an adjustably tensioned stationary belt between which the blades are forwarded.

7. In a machine for sharpening razor blades, the combination with means for forwarding razor blades in a straight path with an edge exposed, of a rotating abrading element of elongated cylindrical shape with its cylindrical surface lying in the path of said edge, and a series of spring fingers opposite the abrading element to guide the blade and hold said edge against the abrading element, said forwarding means including a moving belt and a stationary guide surface between which said blades are forwarded.

8. In a machine for sharpening razor blades, the combination with means for forwarding razor blades in a straight path with an edge exposed, of a rotating abrading element of elongated cylindrical shape with its cylindrical surface lying in the path of said edge, and a series of spring fingers opposite the abrading element to guide the blade and hold said edge against the abrading element, said forwarding means including a moving belt and a stationary guide surface between which the blades are forwarded and a second guide surface engaging the moving belt to hold the blades against the first mentioned surface.

9. In a sharpening machine for curved razor blades, the combination with an abrading element, of a belt engaging the concave side of said blades to forward the same with an edge of the blade exposed beyond one edge of the belt for engagement with said abrading element, the other edge portion of the belt extending beyond the other edge of the blade, said belt having a series of slots for receiving said other edge of the blades.

10. In a sharpening machine for curved razor blades, the combination with an abrading element, of a belt engaging the concave side of said blades to forward the same with an edge of the blade exposed beyond one edge of the belt for engagement with said abrading element, the other edge portion of the belt extending beyond the other edge of the blade, said belt having a series of slots for receiving said other edge of the blades, and stationary guide means engaging the extending portion of said belt.

11. In a sharpening machine for curved razor blades, the combination with an abrading element, of a belt engaging the concave side of said blades to forward the same with an edge of the blade exposed beyond one edge of the belt for engagement with said abrading element, the other edge portion of the belt extending beyond the other edge of the blade, said belt having a series of slots for receiving said other edge of the blades, and stationary guide means engaging angularly relating surfaces of the extending portion of said belt.

12. In a machine for sharpening curved razor blades, the combination with means for forwarding curved razor blades in a straight path with an edge exposed, said means including a blade forwarding belt provided with a series of slots adapted to receive the other edge of the blades, of a pair of rotating shafts parallel with and on opposite sides of the path of the blades and out of vertical and horizontal alignment with each other, a series of cylindrical abrading elements mounted in spaced relation on each of said shafts for rotation in the path of the exposed edge of the blades, the abrading elements on one shaft entering into the spaces between the abrading elements on the other shaft to abrade surfaces intersecting at said edge of the blades, and the abrading elements on one shaft being disposed to engage the concave side of the blades along the exposed edge and the abrading elements on the other shaft being disposed to engage the convex side of the blades along said edge, and stationary guide plates on opposite sides of said belt, one of said plates being cut away adjacent the abrading elements on the concave side of the blades to permit the abrading elements to engage the concave side of the exposed edge of the blades.

13. In a machine for sharpening curved razor blades, the combination with means for forwarding curved razor blades in a straight path with an edge exposed, said means including a blade forwarding belt provided with a series of slots adapted to receive the other edge of the blades, of a pair of rotating shafts parallel with and on opposite sides of the path of the blades and out of horizontal and vertical alignment with each other, a series of cylindrical hones mounted in spaced relation on each of said shafts for rotation in the path of the exposed edge of the blades, means for removing burrs and grit from said edge prior to honing, and stationary guide plates on opposite sides of said belt, one of said plates being cut away adjacent the abrading elements on the concave side of the blades to permit the hones to engage the concave side of the exposed edge of the blades.

14. In an abrading machine for curved razor blades, the combination with means for forwarding razor blades in a straight line path with an edge exposed, of a rotatable shaft parallel to the path of the blades, abrading members on said shaft in the path of the exposed edge of the blades, spring fingers cooperating with the abrading members to hold the exposed edge of the blades against the surface of the abrading members, and stationary guide surfaces engaging the forwarding means, said forwarding means including a blade forwarding belt provided with a series of slots adapted to receive the other edge of the blades.

15. In an abrading machine for curved razor blades, the combination with means for forwarding curved razor blades in a straight line path with an edge exposed, of a pair of rotatable shafts parallel to and on either side of the path of the blades, and a series of abrading members on each of said shafts for rotation in the path of the exposed edge of the blades, the abrading members being positioned in spaced relation along the shafts with the abrading members on one shaft projecting into the spaces between the abrading members on the other shaft, and said means including a blade forwarding belt provided with a series of slots adapted to receive the other edge of the blades.

16. In an abrading machine for curved razor blades, the combination with means for forwarding curved razor blades in a straight path with an edge exposed, of a rotatable shaft parallel to the path of said blades, and a series of fibrous members secured circumferentially about said shaft in the path of the exposed edge of the blades, said forwarding means including a blade forwarding belt provided with a series of slots adapted to receive the other edge of the blades.

17. In an abrading machine for curved razor blades, the combination with means for forwarding curved razor blades in a straight path with an edge exposed, of a pair of rotatable shafts parallel to and on either side of the path of the blades and a series of fibrous members secured circumferentially about each of said shafts in the path of the exposed edge of the blades, said forwarding means including a blade forwarding belt provided with a series of slots adapted to receive the other edge of the blades.

18. In an abrading machine for curved razor blades, the combination with means for forwarding curved razor blades in a straight path with an edge exposed, of a pair of rotatable shafts parallel to and on either side of the path of the blades and a series of fibrous members secured circumferentially about each of said shafts in the path of the exposed edge of the blades, said forwarding means including a blade forwarding belt provided with a series of slots adapted to receive the other edge of the blades, and the fibrous members on one shaft being staggered with respect to those on the other shaft.

19. In an abrading machine for curved razor blades, the combination with means for forwarding curved razor blades in a straight path with an edge exposed, of a rotatable shaft parallel to the path of the blades, said shaft having spaced annular enlargements thereon, and a series of fibrous members secured circumferentially about said enlargements in the path of the exposed edge of the blades, said forwarding means including a blade forwarding belt provided with a series of slots adapted to receive the other edge of the blades.

In testimony whereof, I have signed my name to this specification.

THOMAS CORNELIUS SHEEHAN.